Figure 1:
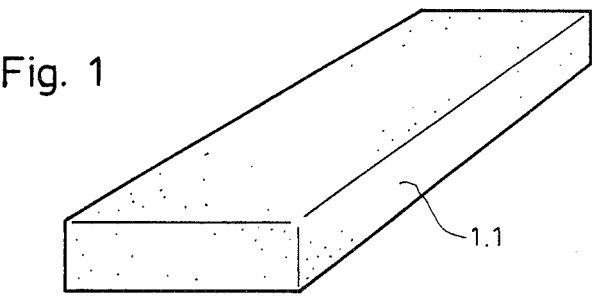

United States Patent [19]

Brand et al.

[11] 4,335,182

[45] Jun. 15, 1982

[54] METHOD OF PRODUCING A MOLDED COMPOSITE FOAM BODY PROVIDED WITH A COVER LAYER AND THE RESULTANT PRODUCT

[75] Inventors: Konrad Brand, Hoehenkirchen; Dieter Franz, Jettenbach, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 224,658

[22] Filed: Jan. 13, 1981

[30] Foreign Application Priority Data

Jan. 25, 1980 [DE] Fed. Rep. of Germany ....... 3002584

[51] Int. Cl.³ .............................................. B29D 27/00
[52] U.S. Cl. .................................. 428/319.3; 264/162; 264/321; 264/DIG. 66; 428/159
[58] Field of Search ................. 264/46.6, 45.3, 321, 264/DIG. 66, 162; 428/319.3, 159

[56] References Cited

U.S. PATENT DOCUMENTS

| | | | |
|---|---|---|---|
| 2,767,436 | 10/1956 | Noland et al. ...................... | 264/321 |
| 2,863,797 | 12/1958 | Meyer ............................. | 264/321 X |
| 2,928,456 | 3/1960 | Potchen et al. ............... | 428/319.3 X |
| 3,306,967 | 2/1967 | Turkewitch ........................ | 264/321 |
| 3,616,172 | 10/1971 | Rubens ............................ | 264/46.6 X |
| 3,873,654 | 3/1975 | Smith .............................. | 264/321 X |
| 3,879,245 | 4/1975 | Fetherston et al. ............. | 264/321 X |
| 4,078,959 | 3/1978 | Palfey et al. ..................... | 264/321 X |
| 4,124,670 | 11/1978 | Cecka et al. ................... | 264/46.6 X |
| 4,129,634 | 12/1978 | Cecka et al. ................... | 264/46.6 X |
| 4,256,797 | 3/1981 | Stamper et al. ................ | 264/321 X |
| 4,268,571 | 5/1981 | McCarthy ....................... | 264/46.9 X |

FOREIGN PATENT DOCUMENTS 2126587 12/1971 Fed. Rep. of Germany .
781046 8/1957 United Kingdom ................ 264/321

*Primary Examiner*—Philip Anderson
*Attorney, Agent, or Firm*—W. G. Fasse; D. H. Kane, Jr.

[57] ABSTRACT

Mold bodies, for example, for the wings of rotary wing aircraft are formed by densifying a core of a hard foam material under such pressure and temperature conditions that later, when the core is placed into a mold together with the cover layer of a heat curable synthetic material, the core will expand again in response to heating the cover layer to its curing temperature. This expansion causes an intimate, complete bond between the core and the cover layer.

4 Claims, 4 Drawing Figures

METHOD OF PRODUCING A MOLDED COMPOSITE FOAM BODY PROVIDED WITH A COVER LAYER AND THE RESULTANT PRODUCT

CROSS-REFERENCE TO RELATED APPLICATION:

The present application corresponds to German Patent Application P 30 02 584.4-16, filed in Federal Republic of Germany on Jan. 25, 1980. The priority of said German filing date is hereby claimed.

BACKGROUND OF THE INVENTION

The invention relates to a method for manufacturing a molded body. More specifically, the invention combines a core body of heat moldable hard foam material with a cover layer made at least partially of heat curable synthetic material. Such molded bodies may, for example, be made into wing blades for rotary wing aircraft and the like.

In the manufacture of bodies in accordance with the so-called sandwich type construction a support core or a base body is used which is made of a hard foam material such as polyvinylchloride foam which may be deformed while heated. The support core is covered by a cover layer of heat curable synthetic material, for example, synthetic resin including a fiber reinforcement. The cover layer and the support body are placed into a mold. However, when the cover layers are heated to their hardening or curing temperature it happened in the past that the support core was subject to a shrinking or further shrinking. Such shrinking caused the separation between the core and the cover layer at least in certain areas. Heretofore attempts have been made to avoid such separation by providing the core with an excess dimension prior to combining it with the cover layer. However, such excess dimension causes substantial difficulties when inserting the core into the mold and also in closing the mold.

It has also been proposed heretofore to preshrink the support core prior to its insertion into the mold. However, this approach is rather time consuming and additionally very wasteful in its energy requirements. For example, in preshrinking a support core of a rotor blade of a rotary wing aircraft experience shows that a preshrinking treatment of at least eight hours is required if a subsequent shrinking of the support core during the curing or hardening of the subsequently applied cover laminate is to be completely eliminated. Thus, preshrinking imparts an irreversible dimension to the core material.

OBJECTS OF THE INVENTION

In view of the above it is the aim of the invention to achieve the following objects singly or in combination:
to avoid in the formation of a molded body of the above type the subsequent shrinking effect and its consequences;
to avoid the use of a preshrinking as well as the over dimensioning of the support core;
to not only avoid the subsequent shrinking effect, but also to compensate any machining tolerances of the basic support core; and
to make it possible that the support core may be dimensioned so that it will easily fit into the common mold together with the cover layer.

SUMMARY OF THE INVENTION

According to the invention the support core or basic body is predensified prior to its insertion into the mold to such an extent that it has a tendency to elastically expand again upon exposure to the heat necessarily required for the curing of the cover layer. Hence the predensified core will expand to such an extent that the expansion back into the non-densified condition will cause inside the mold the pressure which is required for an intimate bonding between the support core and the cover layer. Thus, the predensification as taught by the invention is reversible. By controlling the expansion effect in accordance with the selection of the preliminary densification of the base body or core it has become possible to completely compensate the above mentioned subsequent shrinking effect. A further advantage is seen in that the preliminary densification also completely compensates for machining tolerances of the base body or core resulting from its preceding molding. Thus, it has also become possible, according to the invention to dimension the base body or core for achieving an easy insertion of the core into the common mold together with the cover layer.

BRIEF FIGURE DESCRIPTION

Figure 2:
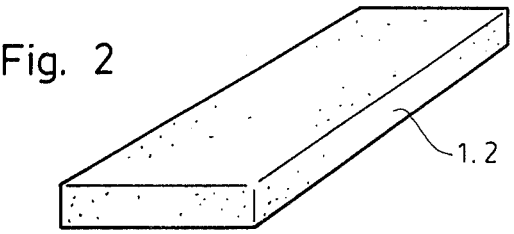
Figure 3:
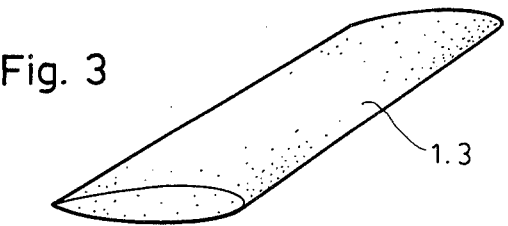

In order that the invention may be clearly understood, it will now be described, by way of example, with reference to the accompanying drawings, wherein:
FIG. 1 shows a hard foam material body;
FIG. 2 shows the body of FIG. 1 after it has been predensified to assume a smaller dimension;
FIG. 3 shows the body of FIG. 2 after it has been subjected to a preliminary shaping step to form a support core or base body for a rotor blade; and
FIG. 4 shows a perspective view of a mold in which a form body such as a rotor wing member is shaped into the desired final form, whereby the facing end is shown in section.

DETAILED DESCRIPTION OF PREFERRED EXAMPLE EMBODIMENTS AND OF THE BEST MODE OF THE INVENTION

Figure 4:
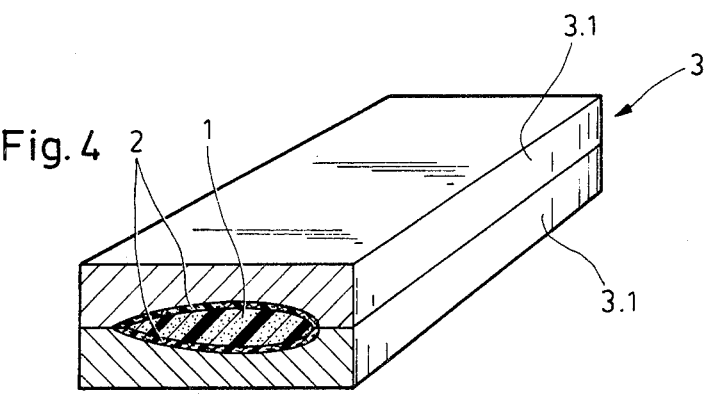

FIG. 1 shows a blank 1.1 of a hard foam material to be used for manufacturing the support core 1 shown in FIG. 4. The support core 1 is made of heat moldable hard foam material, for example, polyvinylchloride foam and inserted between two cover layers 2 which are at least partially made of heat hardenable or curable synthetic material such as a synthetic resin forming the impregnating material of a glass fiber or carbon fiber webbing. The cover layers 2 may be formed by laminating a plurality of layers one on top of the other to form webbing mats.

The blank 1.1 is subjected to a preliminary mechanical densification according to the invention, for example, in an autoclave not shown, in which the forming or shaping temperature of the foam material of the blank 1.1 is maintained at about 110° C. at a pressure of about 1.3 bar which is sufficient to cause said preliminary densification. The blank 1.1 is not removed from the autoclave until the temperature therein has cooled down to room temperature, whereby the intermediate product 1.2 having smaller dimensions than the blank 1.1 is formed as shown in FIG. 2.

After the predensification the intermediate product 1.2 is brought into a preliminary shape 1.3, for example, by a milling operation. The preliminary shape 1.3 is shown in FIG. 3 and this preliminary shape 1.3 is suitable for insertion between the cover layers 2 in a mold 3 shown in FIG. 4 in which a rotor blade is molded. The cover layers 2 are applied to the inner surfaces of the two mold halves 3.1 forming the mold 3 as shown in FIG. 4. The application of the cover layers 2 to the inner mold cavity surfaces may be performed by a laminating procedure after application of the cover layers 2 to the inner surfaces of the mold half 3.1, the preliminary shape 1.3 forming a core is inserted into one mold half and the mold is closed, whereupon the mold is heated to the curing temperature of about 110° C. for curing the cover layer 2. Simultaneously, the preliminary shape 1.3 is also heated to its forming temperature by said curing temperature so that the preliminary shape 1.3 has a tendency to expand to get back into its original shape. It has been found that this elastic tendency corresponds to the degree of preliminary densification. This degree is determined by comparing the volumes of the blank 1.1 with that of the intermediate product 1.2. This tendency to expand in response to the curing temperature results in a pressure in an outward direction against the cover layers 2, whereby wrinkling of the cover layers and the inclusion of air bubbles between the core and the cover layers are avoided.

In view of the above it is clear that the expansion pressure which is required for the curing of the cover layers 2 and which is determined by the degree of densification will depend substantially on the dimensions of the form body being produced.

Thus, it is simple to determine the degree of densification required for any particular shape or model only once in a routine procedure. This densification degree or value is then applicable to all bodies of the same shape or to all models of the same configurations.

In the above embodiment the densification was performed prior to the machining operation. However, it will be appreciated that the teaching of the invention may also be practiced by first machining the blank to a sufficiently larger dimension which will permit the preliminary densification of the machined shape prior to its insertion into the mold.

Further, where the same model or shape is to be produced in a mass production sequence, it is possible, according to the invention, to machine a plurality of support cores from a larger single preliminarily densified block of foam material.

Although the invention has been described with reference to specific example embodiments, it will be appreciated, that it is intended, to cover all modifications and equivalents within the scope of the appended claims.

What is claimed is:

1. A method for producing a mold body by combining a core blank of heat moldable hard foam material with a cover layer made at least partially of heat curable synthetic material in a common mold having at least one mold cavity, comprising the following steps, starting with said foam core blank having dimensions larger than said mold cavity, mechanically densifying said core blank prior to its insertion into said mold cavity whereby said core blank has a tendency to elastically expand in response to heating, said mechanically densifying step taking place under a pressure substantially corresponding to the pressure required to be applied for the shaping of the cover layer in the presence of a shaping and curing temperature, said mechanical densifying step producing said core in a predensified form with dimensions substantially corresponding to the dimensions of the mold cavity, lining said mold cavity with said cover layer to form a lined mold cavity, inserting said predensified core into said lined mold cavity, closing the mold cavity and exposing said cover layer in the mold to said shaping and curing temperature whereby said shaping and curing temperature triggers the tendency of said predensified core into an elastic expansion of the predensified core inside said mold to press the core against said cover layer as the cover layer is curing to thereby intimately bond the coverlayer to the core due to said curing under pressure caused by said elastic expansion of said core.

2. The method of claim 1, wherein said core is machined to the desired shape after the densification.

3. The method of claim 1, wherein said core is machined prior to the densification to a shape slightly larger than the densified shape.

4. A mold body when manufactured by the steps of claim 1 or 2 or 3.

* * * * *